(12) United States Patent
Mody et al.

(10) Patent No.: US 7,889,819 B2
(45) Date of Patent: Feb. 15, 2011

(54) METHODS AND SYSTEMS FOR SAMPLING FREQUENCY OFFSET DETECTION, CORRECTION AND CONTROL FOR MIMO OFDM SYSTEMS

(76) Inventors: Apurva Mody, 332229 Georgia Tech Station, Atlanta, GA (US) 80382; Gordon Stuber, 250 14th St. NW., Atlanta, GA (US) 30318

( * ) Notice: Subject to any disclaimer, the term of this patent is extended or adjusted under 35 U.S.C. 154(b) by 1046 days.

(21) Appl. No.: 10/680,629

(22) Filed: Oct. 6, 2003

(65) Prior Publication Data
US 2004/0131012 A1 Jul. 8, 2004

Related U.S. Application Data

(60) Provisional application No. 60/416,381, filed on Oct. 4, 2002.

(51) Int. Cl.
H04L 27/06 (2006.01)
H04L 27/28 (2006.01)
H04K 1/10 (2006.01)

(52) U.S. Cl. .................................. 375/344; 375/260

(58) Field of Classification Search ............ 375/260, 375/267, 344, 347, 362; 370/206, 207, 208, 370/210, 503
See application file for complete search history.

(56) References Cited

U.S. PATENT DOCUMENTS

| | | | |
|---|---|---|---|
| 5,732,113 A | 3/1998 | Schmidl et al. | |
| 5,790,784 A * | 8/1998 | Beale et al. ............ | 370/503 |
| 5,867,478 A | 2/1999 | Baum et al. | |
| 6,029,058 A | 2/2000 | Namgoong et al. | |
| 6,035,003 A | 3/2000 | Park et al. | |
| 6,058,105 A | 5/2000 | Hochwald et al. | |
| 6,088,408 A | 7/2000 | Calderbank et al. | |
| 6,115,427 A | 9/2000 | Calderbank et al. | |
| 6,125,149 A | 9/2000 | Jafarkhani et al. | |

(Continued)

FOREIGN PATENT DOCUMENTS

JP 2003060604 A * 2/2003

OTHER PUBLICATIONS

Luise, Marco;Low-Complexity Blind Carrier Frequency Recovery for OFDM Signals Over Frequency-Selective Radio Channels; IEEE Transactions on Communications; vol. 50, No. 7; Jul. 2002.

(Continued)

*Primary Examiner*—Betsy L Deppe

(57) ABSTRACT

Methods and systems that are capable of detecting and correcting the sampling frequency offset as part of signal synchronization in MIMO OFDM systems. An exemplary MIMO OFDM system includes a transmitter with a number of OFDM modulators that provide data to antennas for transmission across a channel to a receiver. The OFDM modulators include a training symbol inserter that may insert a matrix of pilot tones into the data. The data including the matrix of pilot tones is received by a receiver having a number of OFDM demodulators including a synchronization circuit. The synchronization circuit uses the matrix of pilot tones to detect and correct the sampling frequency offset as part of the signal synchronization. The synchronization circuit may apply an open loop process including sampling frequency offset estimation, phase rotation, and channel estimation. Alternatively, the synchronization circuit may apply a closed loop process including error generation, loop filtering and accumulation as well as sampling frequency offset estimation, phase rotation, and channel estimation.

6 Claims, 6 Drawing Sheets

U.S. PATENT DOCUMENTS

| | | | |
|---|---|---|---|
| 6,137,847 | A | 10/2000 | Stott et al. |
| 6,148,024 | A | 11/2000 | Ho et al. |
| 6,185,258 | B1 | 2/2001 | Alamouti et al. |
| 6,188,736 | B1 | 2/2001 | Lo et al. |
| 6,314,083 | B1 | 11/2001 | Kishimoto et al. |
| 6,317,411 | B1 | 11/2001 | Whinnett et al. |
| 6,373,861 | B1 | 4/2002 | Lee |
| 6,473,467 | B1 | 10/2002 | Wallace et al. |
| 6,539,063 | B1 | 3/2003 | Peyla et al. |
| 6,542,556 | B1 | 4/2003 | Kuchi et al. |
| 6,546,055 | B1 | 4/2003 | Schmidl et al. |
| 6,549,581 | B1 | 4/2003 | Izumi |
| 6,587,526 | B1 | 7/2003 | Li et al. |
| 6,693,982 | B1 | 2/2004 | Naguib et al. |
| 6,771,706 | B2 | 8/2004 | Ling et al. |
| 6,792,035 | B2 | 9/2004 | Kontola |
| 6,850,481 | B2 | 2/2005 | Wu et al. |
| 6,865,237 | B1 | 3/2005 | Boariu et al. |
| 6,888,899 | B2 | 5/2005 | Raleigh et al. |
| 6,952,454 | B1 | 10/2005 | Jalali et al. |
| 6,961,388 | B2 | 11/2005 | Ling et al. |
| 6,985,434 | B2 | 1/2006 | Wu et al. |
| 6,996,195 | B2 | 2/2006 | Kadous |
| 7,009,931 | B2 * | 3/2006 | Ma et al. ............... 370/208 |
| 7,010,029 | B1 | 3/2006 | Naguib et al. |
| 7,058,140 | B2 | 6/2006 | Smart |
| 7,110,350 | B2 | 9/2006 | Li et al. |
| 7,133,459 | B2 | 11/2006 | Onggosanusi et al. |
| 7,139,321 | B2 | 11/2006 | Giannakis et al. |
| 7,149,239 | B2 | 12/2006 | Hudson |
| 2001/0031019 | A1 | 10/2001 | Jafarkhani et al. |
| 2001/0050964 | A1 | 12/2001 | Foschini et al. |
| 2001/0053143 | A1 | 12/2001 | Li et al. |
| 2002/0003774 | A1 | 1/2002 | Wang et al. |
| 2002/0041635 | A1 * | 4/2002 | Ma et al. ............... 375/267 |
| 2002/0044524 | A1 | 4/2002 | Laroia et al. |
| 2002/0122381 | A1 | 9/2002 | Wu et al. |
| 2002/0122382 | A1 * | 9/2002 | Ma et al. ............... 370/208 |
| 2002/0154705 | A1 | 10/2002 | Walton et al. |
| 2002/0181390 | A1 | 12/2002 | Mody et al. |
| 2002/0181509 | A1 | 12/2002 | Mody et al. |
| 2002/0191703 | A1 | 12/2002 | Ling et al. |
| 2003/0043928 | A1 | 3/2003 | Ling et al. |
| 2005/0041693 | A1 * | 2/2005 | Priotti ............... 370/503 |
| 2006/0227904 | A1 | 10/2006 | Mueller-Weinfurtner et al. |

OTHER PUBLICATIONS

Keller, Thomas; Piazzo, Lorenzo; Mandarini, Paolo; Hanzo, Lajos; Orthogonal Frequency Division Multiplex Synchronization Technique for Frequency-Selective Fading Channels; IEEE Journal on Selected Areas in Communication; vol. 19. No. 6; Jun. 2001.

Yang, Baoguo; Lataief, Khaled Ben; Cheng, Robert S.; Ca, Zhigang; Timing Recovery for OFDM Transmission; IEEE Journal on Selected Areas in Communication; vol. 18. No. 11; Nov. 2000.

Honan, Patrick; Tureli, Ufuk; Blind Carrier Offset Estimation for MIMO OFDM Systems Carrier Rao Bound and Nonlear Least Squares; 2003 Conference on Information Sciences and Systems; Johns Hopkins University; Mar. 2003.

Abhayawardhana. V.S.; Wassell, I.J.; Residual Frequency Offset Correction for Coherently Modulated OFDM Systems in Wireless Communication: Department of Engineering. University of Cambridge, UK, 2001.

Alamouti, Siavash M., "A Simple Transmit Diversity Technique for Wireless Communications," IEEE Journal on Select Areas in Communication, vol. 16, No. 8, Oct. 1998, pp. 1451-1458.

Biedka, T.E.: "A comparison of initialization schemes for blind adaptive beamforming," Acoustics, Speech and Signal Processing, 1998. ICASSP '98. Proceedings of the 1998 IEEE International conference on; vol. 2, May 12-15, 1998 pp. 1665-1668 vol. 3.

Jafarkhani, H.; "A Quasi-Orthogonal Space-Time Block Code," Communications, IEEE Transactions on Communications, vol. 49, Issue 1, Jan. 2001 pp. 1-4.

Li, Ye (Geoffrey), Seshadri, Nambirajan, and Ariyavisitakul, Sirikiat, "Channel Estimation for OFDM Systems with Transmitter Diversity in Mobile Wireless Channels," IEEE Journal on Selected Areas in Communications, vol. 17, No. 3, Mar. 1999, pp. 461-471.

Mody, A.N. and Stuber, G.L.; "Parameter Estimation for OFDM with Transmit-Receive Diversity," Proceedings of VTC Rhodes, Greece, 2001.

Mody, A.N. and Stuber, G.L.; "Receiver Implementation for a MIMO OFDM System," Proceedings of GLOBECOM 2002, Taipei, Taiwan, Nov. 2002.

Mody, A.N.; Stuber, G.L.; "Synchronization of MIMO OFDM Systems," Proceedings of GLOBECOM 2001, San Antonio, 2001, vol. 1, pp. 509-513.

Mody, Apurva N. and Stuber, Gordon L., "Efficient Training and Synchronization Sequence Structures for MIMO OFDM," School of Electrical and Computer Engineering, Georgia Institute of Technology, Atlanta, GA 30332 and Wi-LAN, Wireless Data Communications Inc., Atlanta, Georgia, 2001, pp. 1-7.

Mody, Apurva N. and Stuber, Gordon L., "Parameter Estimation for MIMO OFDM Systems," School of Electrical and Computer Engineering, Georgia Institute of Technology, 2001, Atlanta, GA.

Naguib, A.F.; Tarokh, V.; Seshadri, N.; Calderbank, A.R.; "Space-time coded modulation for high data rate wireless communications," Global Telecommunications conference, 1997. Globecom '97., IEEE vol. 1, Nov. 3-8, 1997 pp. 102-109 vol. 1.

Schmidl, Timothy M. and Cox, Donald C., "Robust Frequency and Timing Synchronization for OFDM," IEEE Transactions on Communications, vol. 45, No. 12, Dec. 1997, pp. 1613-1621.

Tarokh, Vahid, Jafarkhani Hamid, and Calderbank, A.R., "Space-Time Block Codes from Orthogonal Designs," IEEE Transactions on Information Theory, vol. 45, No. 5, Jul. 1999, pp. 1456-1467.

Tarokh, Vahid, Jafarkhani, Hamid, and Calderbank, A. Robert, "Space-Time Block Coding for Wireless Communications: Performance Results," IEEE Journal on Selected Areas in Communications, vol. 17, No. 3, Mar. 1999, pp. 451-460.

Weisstein, Eric W., "Gram-Schmidt Orthonormalization." From MathWorld-A Wolfram Web Resource. http://mathworld.wolfram.com/Gram-SchmidtOrthonormalization.html; copyright 1999-2006, printed Mar. 16, 2006.

Notice of Allowability for U.S. Appl. No. 10/245,090 dated Jun. 8, 2007.

Office Action for U.S. Appl. No. 10/245,090 mailed Nov. 24, 2006.

Office Action for U.S. Appl. No. 10/245,090 mailed Mar. 20, 2006.

Notice of Allowability for U.S. Appl. No. 10/128,821 dated Mar. 7, 2006.

Office Action for U.S. Appl. No. 10/128,821 mailed Dec. 8, 2005.

Notice of Allowability for U.S Appl. No. 10/128,756 dated Aug. 22, 2007.

Office Action for U.S. Appl. No. 10/128,756 mailed Jan. 26, 2007.

Office Action for U.S. Appl. No. 10/128,756 mailed Mar. 8, 2006.

Notice of Allowability for U.S. Appl. No. 10/264,546, mailed Jun. 19, 2007.

Office Action for U.S. Appl. No. 10/264,546, mailed Oct. 24, 2006.

* cited by examiner

METHODS AND SYSTEMS FOR SAMPLING FREQUENCY OFFSET DETECTION, CORRECTION AND CONTROL FOR MIMO OFDM SYSTEMS

CROSS-REFERENCE TO RELATED APPLICATION

The present application claims priority to and benefit of the prior filed co-pending and commonly owned provisional application, filed in the United States Patent and Trademark Office on Oct. 4, 2002, assigned Application No. 60/416,381, and incorporated herein by reference.

FIELD OF THE INVENTIONS

The inventions relate generally to wireless communication systems that employ Orthogonal Frequency Division Multiplexing (OFDM). More particularly, the inventions are related to systems and methods for detecting, correcting, and controlling the sampling frequency offset in a Multi-Input, Multi-Output (MIMO) OFDM system.

BACKGROUND OF THE INVENTIONS

In wireless communication systems, a signal may be sent at a certain frequency within specified parameters, in what is called a transmission path. Recent developments have enabled the simultaneous transmission of multiple signals over a single transmission path. One of these methods of simultaneous transmission is referred to as Frequency Division Multiplexing (FDM). In FDM, the transmission path is divided into sub-channels. Information (e.g. voice, video, audio, text, data, etc. . . . ) is modulated and transmitted over the sub-channels at different sub-carrier frequencies.

A particular type of FDM is Orthogonal Frequency Division Multiplexing (OFDM). In OFDM technology, the sub-carrier frequencies are spaced apart by precise frequency differences. An advantage of OFDM technology is that it is generally able to overcome multiple path effects. Another advantage of OFDM technology is that it is typically able to transmit and receive large amounts of information. A further advantage is that by using multiple transmitting antennas and multiple receiving antennas in an OFDM system, it is possible to increase the capacity of transmitted and received data while generally using the same amount of bandwidth as in a system with one transmitting and one receiving antenna. Because of these advantages, much research has been performed to advance OFDM technology.

OFDM technology is typically divided into two categories: Single-Input, Single-Output (SISO); and Multi-Input, Multi-Output (MIMO). SISO utilizes a single transmitting antenna to transmit signals and a single receiving antenna to receive the signals. MIMO uses multiple transmitting antennas and multiple receiving antennas.

In typical communication systems, a preamble, at the beginning of each data transmission, is usually added as a prefix to the data symbols. The data symbols, of course, include the useful data or information (e.g., voice, data, video, etc. . . . ), which is meant to be transmitted to a remote location. The preamble is used to provide information such as frequency tuning, synchronization, and channel parameter estimation. The receiver for an OFDM system in the acquisition mode uses the information in the preamble to perform time synchronization, frequency offset estimation and correction, and channel estimation. Sampling frequency offset may create Inter Carrier Interference (ICI), phase rotation, amplitude distortion and loss in synchronization.

Data in the preamble presents a sampling frequency, which is used to determine if there is a frequency offset between the transmitter and the receiver. The sampling frequency is offset in almost all systems. The transmitter and receiver each have digital clocks with oscillators and those can never be exactly synchronized. The effect of the offset gets worse over time.

A receiving system can monitor and adjust the sampling frequency in one of two ways: using an open loop system or a closed loop system. An open loop system reads the sampling frequency, monitors the offset, and performs appropriate phase rotations and timing adjustment, as the signal passes through the receiver. A closed loop system generates an error signal proportional to the sampling frequency offset, and performs appropriate phase rotations and timing adjustments.

An open loop system is adequate for indoor wireless or fixed wireless applications. But certain signals, such as broadcast signals such as streaming video, change over time and typically need to be continuously monitored. These signals require a closed loop system.

Both open loop and closed loop systems exist for SISO OFDM systems. However, for MIMO OFDM systems, so far as is known, neither open loop nor a closed loop system exists for monitoring and adjusting the sampling frequency offset. In fact, no method or system is known to exist for a MIMO OFDM system that is capable of providing corrections to the sampling frequency offset as part of the signal synchronization.

Accordingly, there is a need for a method or system that is capable of detecting, correcting, and controlling the sampling frequency offset as part of signal synchronization in a MIMO OFDM system.

SUMMARY OF THE INVENTIONS

The inventions provide methods and systems that overcome the deficiencies of the prior art and satisfy the need mentioned in the background. Advantageously, the inventions relate to methods and systems that are capable of detecting and correcting the sampling frequency offset as part of signal synchronization in MIMO OFDM systems.

An exemplary MIMO OFDM system includes a transmitter with a number of OFDM modulators that provide data to antennas for transmission across a channel to a receiver. The OFDM modulators include a training symbol inserter that may insert a matrix of pilot tones into the data. The data including the matrix of pilot tones is received by a receiver having a number of OFDM demodulators including a synchronization circuit. The synchronization circuit uses the matrix of pilot tones to detect and correct the sampling frequency offset as part of the signal synchronization. The synchronization circuit may apply an open loop process including sampling frequency offset estimation, phase rotation, and channel estimation. Alternatively, the synchronization circuit may apply a closed loop process including error generation, loop filtering and accumulation as well as sampling frequency offset estimation, phase rotation, and channel estimation.

Other systems, methods, features, and advantages of the inventions will become apparent to a person having skill in the art upon examination of the following drawings and

DETAILED DESCRIPTION

Figure 1:
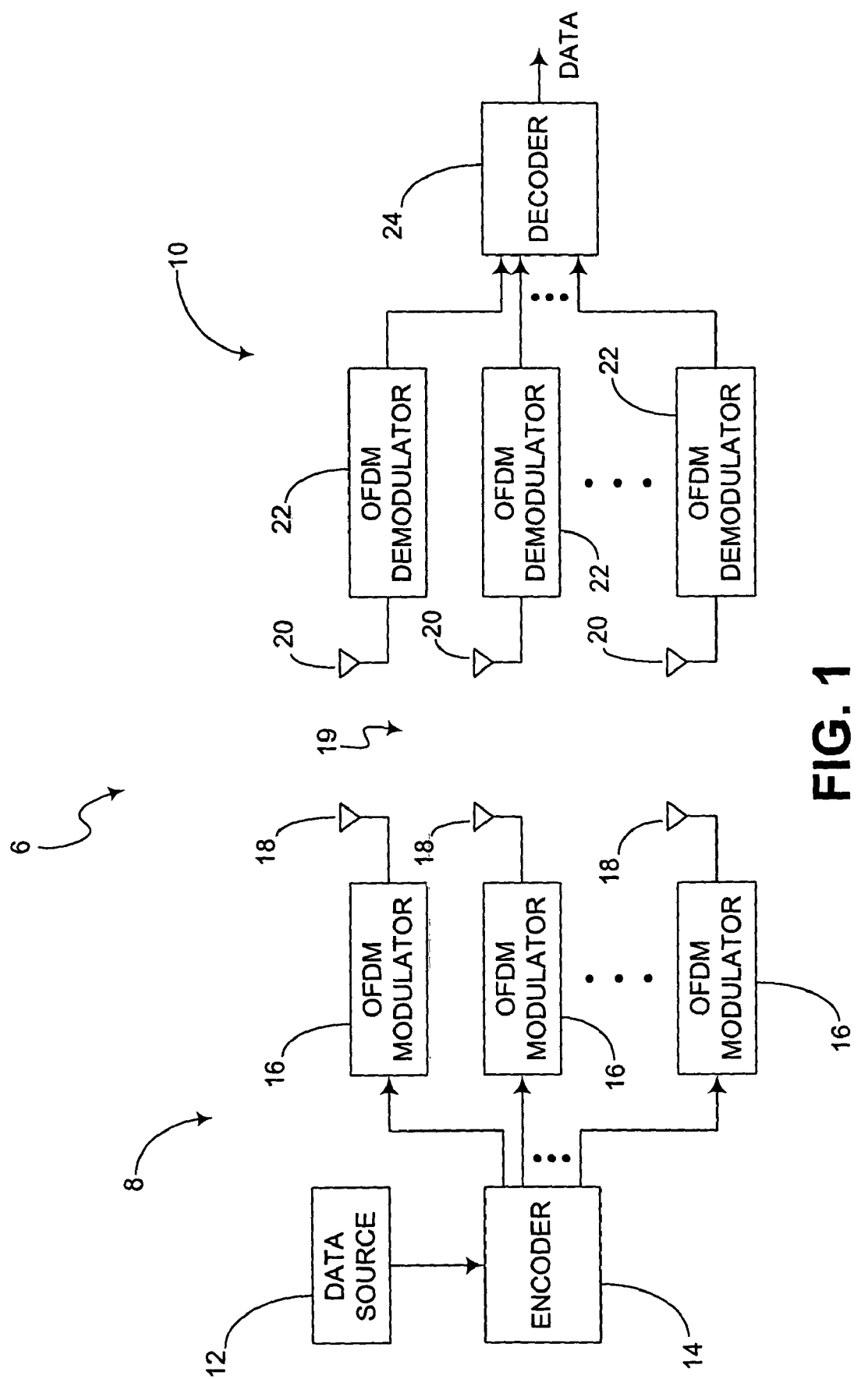
FIG. 1 is a block diagram illustrating an exemplary embodiment of a Multi-Input, Multi-Output (MIMO) Orthogonal Frequency Division Multiplexing (OFDM) system.

FIG. 1 illustrates an exemplary embodiment of a Multi-Input, Multi-Output (MIMO) Orthogonal Frequency Division Multiplexing (OFDM) system 6 according to the inventions. The MIMO OFDM system 6 may be implemented as a wireless system for the transmission and reception of data across a wireless channel 19. The MIMO OFDM system 6, for example, may be part of a wireless Local Area Network (LAN) system or wireless Metropolitan Area Network (MAN) system, cellular telephone system, or other type of radio or microwave frequency system incorporating either one-way or two-way communication over a range of distances.

It is also possible for the exemplary MIMO OFDM system 6 illustrated in FIG. 1 to be used in a system that includes an array of sub-channel communication links that carry a number of signals transmitted by a number of transmitting elements to each of a number of receiving elements. In this case, communication links, such as wires in a wiring harness or some alternative wired transmission system, for example, could be used over the distance between a data source and a receiver.

In the exemplary MIMO OFDM system 6 of FIG. 1, a transmitter 8 transmits signals across the wireless channel 19, and a receiver 10 receives the transmitted signals. The transmitter 8 includes a data source 12, which provides the original binary data to be transmitted from the transmitter 8. The data source 12 may provide any type of data, such as, for example, voice, video, audio, text, etc. The data source 12 applies the data to an encoder 14, which encodes the data to allow for error correction. The encoder 14 further processes the data so that certain criteria for space-time processing and OFDM are satisfied. The encoder 14 separates the data onto multiple paths in the transmitter 8, each of which will hereinafter be referred to as a transmit diversity branch (TDB). The separate TDBs are input respectively into OFDM modulators 16, each of which modulates the signal on the respective TDB for transmission by transmitting antennas 18.

Advantageously, the exemplary embodiment illustrated in FIG. 1 may be used in a Single-Input, Single Output (SISO) system, which may be considered a special case of MIMO wherein the number of transmitting and receiving antennas is, respectively, one. In the SISO system example, separation of the data by the encoder 14 is unnecessary since only one set of an OFDM modulator 16 and an antenna 18 is used.

Reference is again made to the exemplary MIMO OFDM system 6 illustrated in FIG. 1. During the encoding by the encoder 14 and modulating by the OFDM modulators 16, data is normally bundled into groups such that the collection of each group of data is referred to as a "frame." Details of a frame as used in the inventions is described below with reference to FIG. 5. Each frame along each TDB is output from a respective OFDM modulator 16. As illustrated in FIG. 1, any number of OFDM modulators 16 may be used. The number of OFDM modulators 16 and respective transmitting antennas 18 may be represented by a variable "Q." The OFDM modulators 16 modulate the respective frames at specific sub-carrier frequencies and respective transmitting antennas 18 transmit the modulated frames over the channel 19.

As noted in the exemplary MIMO OFDM system 6 of FIG. 1, a receiver 10 receives the transmitted signals from the transmitter 8. In particular, on the receiver side of the MIMO OFDM system 6, a number "L" of receiving antennas 20 receive the transmitted signals, which are demodulated by a number L of respective OFDM demodulators 22. The number L may represent any number and is not necessarily the same as the number Q. In other words, the number Q of transmitting antennas 18 may be different from the number L of receiving antennas 20, or they may alternatively be the same. The outputs of the demodulators 22 are input into a decoder 24, which combines and decodes the demodulated signals into data. The decoder 24 outputs the data, which may be received by a device (not shown) that uses the data.

The MIMO OFDM system 6 may include one or more processors, configured as hardware for executing software, particularly software stored in computer-readable memory. The processor can be any custom made or commercially available processor, a central processing unit (CPU), an auxiliary processor among several processors associated with a computer, a semiconductor based microprocessor (in the form of a microchip or chip set), a macro processor, or generally any device for executing software instructions.

When the MIMO OFDM system 6 is implemented in software, it may be stored on any computer-ready medium for use by or in connection with any computer-related system or method. A computer-readable medium is an electronic, magnetic, optical, or other physical device or means that can contain or store a computer program for use by or in connection with a computer related system or method. The MIMO OFDM system 6 can be embodied in any computer-readable medium for use by or in connection with an instruction execution system, apparatus, or device, such as a computer-based system, processor-containing system, or other system that can fetch the instructions from the instruction execution system, apparatus, or device and execute the instruction.

In an alternative embodiment, where the MIMO OFDM system 6 is implemented in hardware, it can be implemented with any or a combination of the following technologies, which are each well known in the art: one or more discrete logic circuits having logic gates for implementing logic functions upon data signals, an application specific integrated circuit (ASIC) having an appropriate combination of logic gates, a programmable gate array (PGA), a field programmable gate array (FPGA), etc.

Figure 2:
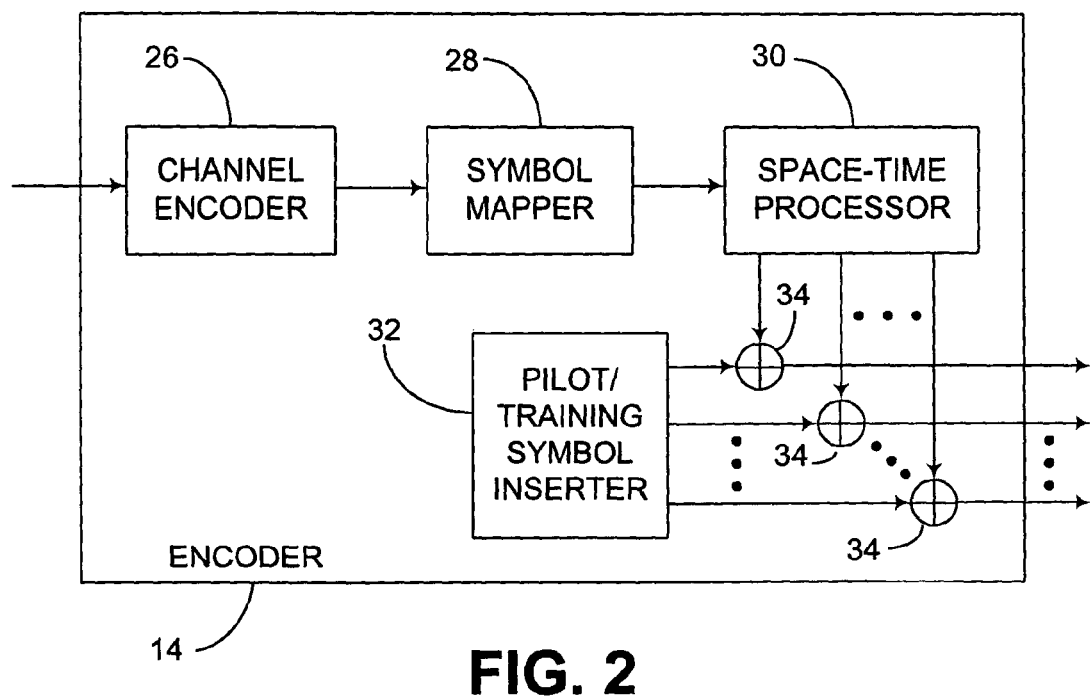
FIG. 2 is a block diagram illustrating an exemplary embodiment of the MIMO encoder shown in FIG. 1.

FIG. 2 illustrates details of the transmitter 8 of the exemplary MIMO OFDM system 6 shown in FIG. 1. In particular, FIG. 2 shows details of an exemplary embodiment of the encoder 14 also shown in FIG. 1. The encoder 14 may be configured such that data from the data source 12 is encoded by a channel encoder 26, which adds parity to the original data to produce channel-encoded data. The channel encoder 26 encodes the data using a scheme that is recognized by the decoder 24 of the receiver 10 and enables the decoder 24 to detect errors in the received data. Errors may arise as a result of environmental conditions of the channel 19 or noise inadvertently added by the transmitter 8 or receiver 10.

The encoder 14 further includes a symbol mapper 28, which receives the channel-encoded data from the channel encoder 26. The symbol mapper 28 maps the channel-encoded data into data symbols. The symbol mapper 28 groups a predetermined number of bits such that each group of bits constitutes a specific symbol chosen from a predetermined alphabet. The symbol mapper 28 further lays out a stream of data symbols within the structure of a frame.

The encoder 14 further includes a space-time processor 30 that receives the data symbol stream from the symbol mapper 28. The space-time processor 30 processes the data symbol stream and outputs the processed data symbols via the respective TDBs. The space-time processor 30 processes the data symbol stream in a manner such that the receiver 10 of the MIMO OFDM system 6 is capable of de-processing or decoding the processed data symbols. The processed data symbols in the TDBs are distributed over Q lines that will eventually be transmitted at precise frequencies spaced apart from each other by a predetermined difference(s) in frequency. By providing a specific frequency difference(s) between the multiple sub-channels, orthogonality can be maintained thereby preventing the OFDM demodulators 22 in the receiver 10 of the MIMO OFDM system 6 from picking up frequencies other than their own designated frequency.

Each TDB provides an input to a respective adder 34. The other input into each of the adders 34 is connected to the output of a training symbol inserter 32. The training symbol inserter 32 provides training symbols to be inserted into the frames of the TDBs. Additional information about the training symbol inserter 32, training symbols including pilot tones, and related actions may be obtained from the commonly owned, pending patent application entitled: "Apparatus and Methods for Providing Efficient Space-Time Structures for Preambles, Pilots and Data for Multi-Input, Multi-Output Communications Systems", which was filed with the United States Patent and Trademark Office on Sep. 17, 2002, assigned Ser. No. 10/245,090, and which is incorporated herein by reference.

The training symbol inserter 32 may be configured so that it is capable of storing multiple sets of training symbols. A particular set of training symbols may be selected, for example, based on desirable communication criteria established by a user. The training symbols for each respective sub-channel may preferably be unique to the particular sub-channel. In order to accommodate amplitude differences between the sub-channels, the training symbols may be designed and adjusted to maintain a constant amplitude at the output of each sub-channel.

Generally, training symbols preferably are inserted at least once in a frame. Training symbols that are inserted at the beginning of the data may be referred to as the preamble to the data. Nevertheless, training symbols may be inserted at other places in the data. Training symbols are used for periodic calibration (synchronization and channel parameter estimation) as explained below in connection with FIG. 5. The training symbols may be indicative of calibration values or known data values. These calibration values or known values may be transmitted across the channel 19, and used to calibrate the MIMO OFDM system 6. Any necessary refinements may be made to the MIMO OFDM system 6, if the received calibration values do not meet desirable specifications.

Further, the training symbols may be used as specific types of calibration values for calibrating particular channel parameters. By initially estimating these channel parameters, offsets in the time domain and frequency domain may be accounted for so as to calibrate the MIMO OFDM system 6.

A particular type of training symbol referred to herein is the pilot tone. In the exemplary embodiment, as described below, pilot tones may be inserted into the data as part of the inventive processes relating to sampling frequency offset detection, correction, and control. Pilot tones may be inserted anywhere in the data. For example, pilot tones may be inserted periodically into the data, or scattered through the data, or inserted into selected points in the data. Generally, pilot tones are used for adjustments in the signal relating to the time-varying nature of the channel.

Per the inventions, the pilot tones are not inserted as individual tones but as known signal transmission matrices for the MIMO configuration. This signal transmission matrix may be in different forms, ranging from diagonal to unitary. However, since there is no diversity with a diagonal matrix, an exemplary embodiment of the inventions uses an orthogonal matrix S, such as:

$$S_{TS} = \begin{bmatrix} S_{-1} & S_{-1} & S_{-1} & S_{-1} \\ -S_{-1} & S_{-1} & -S_{-1} & S_{-1} \\ -S_{-1} & S_{-1} & S_{-1} & -S_{-1} \\ -S_{-1} & -S_{-1} & S_{-1} & S_{-1} \end{bmatrix}$$

for an exemplary system with four transmit antennas to form the pilot tones signal transmission matrix.

Figure 3:
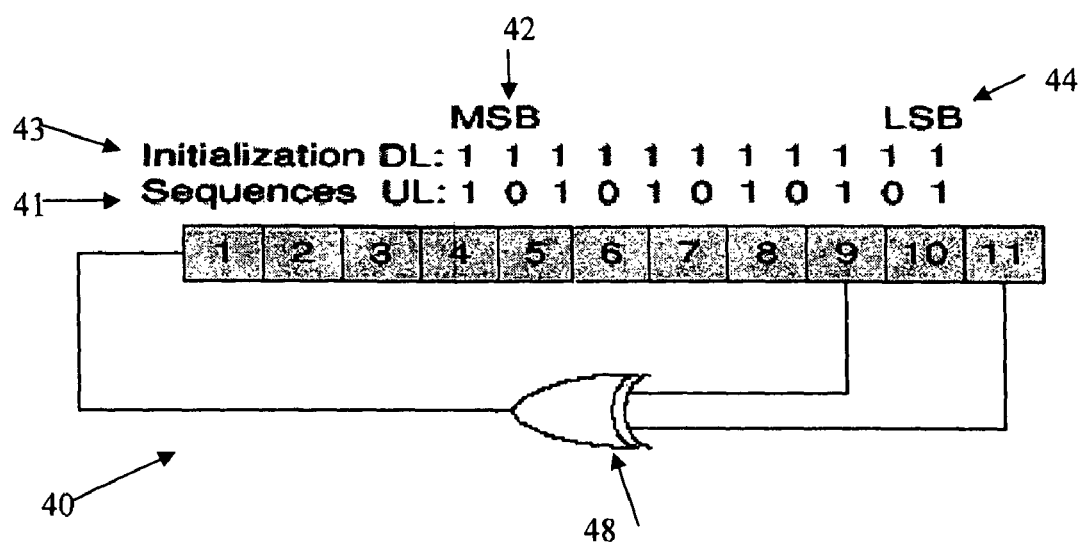
FIG. 3 illustrates exemplary generation of pilot tones matrix as may be used in the inventions.

FIG. 3 is a diagram of one possible system for the generation of a pilot tones matrix. The pilot tones matrix is generated using a shift register circuit 40, as is commonly used in the art for SISO systems. The XOR gate 48 combines/compares the signals from the different positions of a shift register for every pilot tone within the OFDM symbol and generates a new output which is fed to the Most Significant Bit (MSB) of the register. Initialization Sequences are normally fixed for DownLink (DL) 43 and the UpLink (UL) 41. The DL and UL signals are arranged from Most Significant Bit (MSB) 42 to Least Significant (LSB) 44. The output of the LSB is taken and a zero is mapped to a +1 voltage and a 1 is mapped to a −1 voltage. This value is then used to generate the pilot tone matrix as shown above where the value assigned to the variable $S_{1,k}$ is either +1 or −1.

With reference again to FIG. 2, the adders 34 add the training symbols and pilot tones to the frame. Other embodiments may be used in place of the adders 34 for combining the training symbols (including the pilot tones) with the data symbols in the frame. Further, the adders 34 may include additional inputs to allow for flexibility when adding the training symbols, or in the combining of multiple training symbols or even selectable training symbols. After the training symbols are inserted into frames on the respective TDBs, the frames are output from the encoder 14 and input in respective OFDM modulators 16 as illustrated in FIG. 1.

Figure 4:
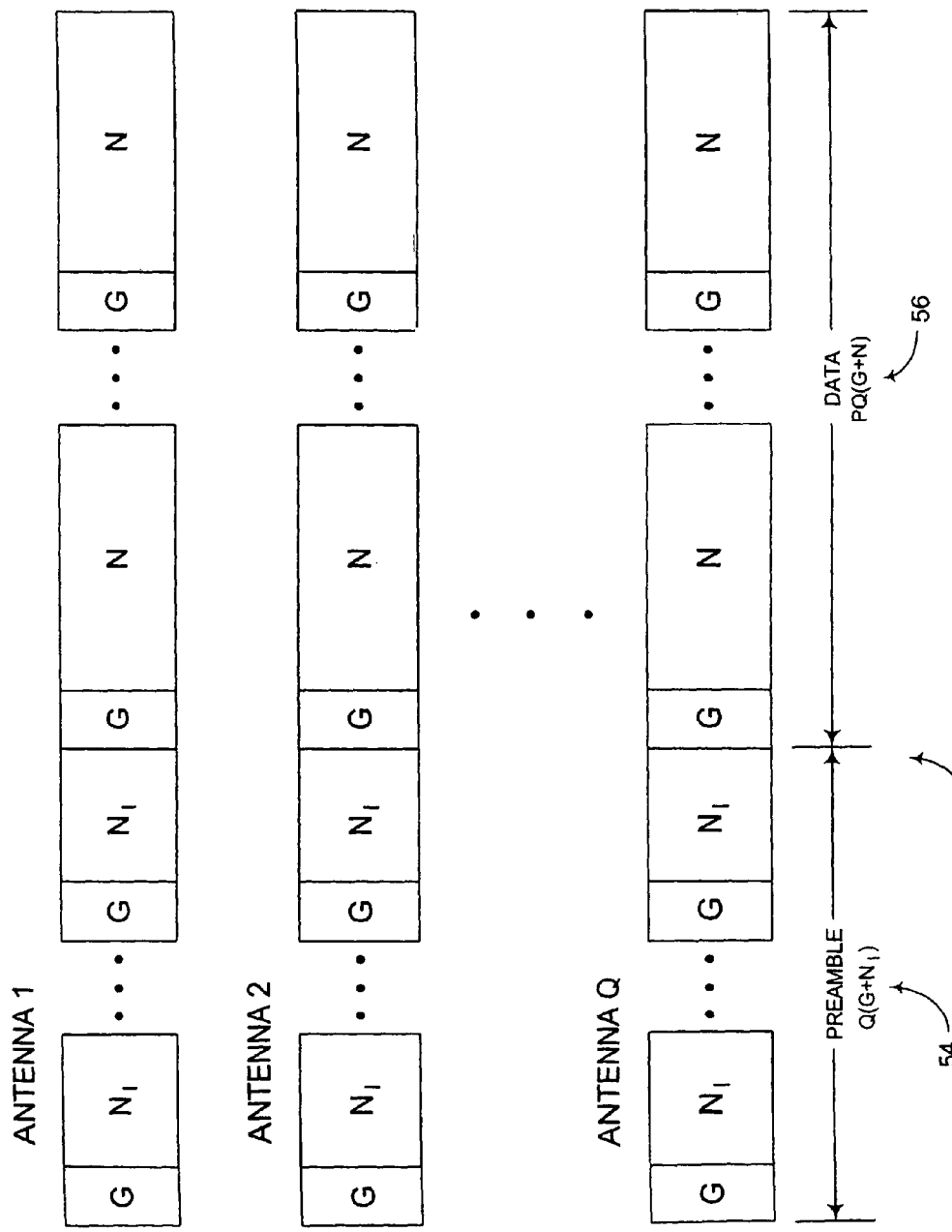
FIG. 4 illustrates an exemplary data frame structure for a MIMO OFDM system.

FIG. 4 illustrates an example of a frame 52 that is transmitted across the channel 19 from the transmitting antennas 18 to the receiving antennas 20. The frame 52 includes a preamble 54 and a data portion 56. The preamble 54 is inserted by the training symbol inserter 32, as mentioned above.

The preamble 54, in general, consists of Q or more training symbols, wherein each training symbol has a length of $G+N_1$ samples in time. The number of samples N is established as a certain fraction of the number of data samples N in an OFDM block, such that N=N/I, where I is an integer, such as 1, 2, 4 . . . . For example, N may be ¼(N). If no predetermined N has been established, the variable N may be given the value equal to N. The training symbol length may be shorter than the length of the symbols in the data portion 56, which has a length of G+N samples. The task of the preamble 54 and the training symbols N in the frame is to help the receiver 10 identify the arrival of the frame 52 and perform sampling frequency offset detection, correction, and control.

In addition, the frame 52 includes a data portion 56 having a plurality of OFDM data symbols N and cyclic prefixes G. The cyclic prefixes G are inserted before each of the OFDM data symbols N. As previously mentioned, the training symbol inserter 32 inserts pilot tones (not shown) within the OFDM data symbols N.

Figure 5:
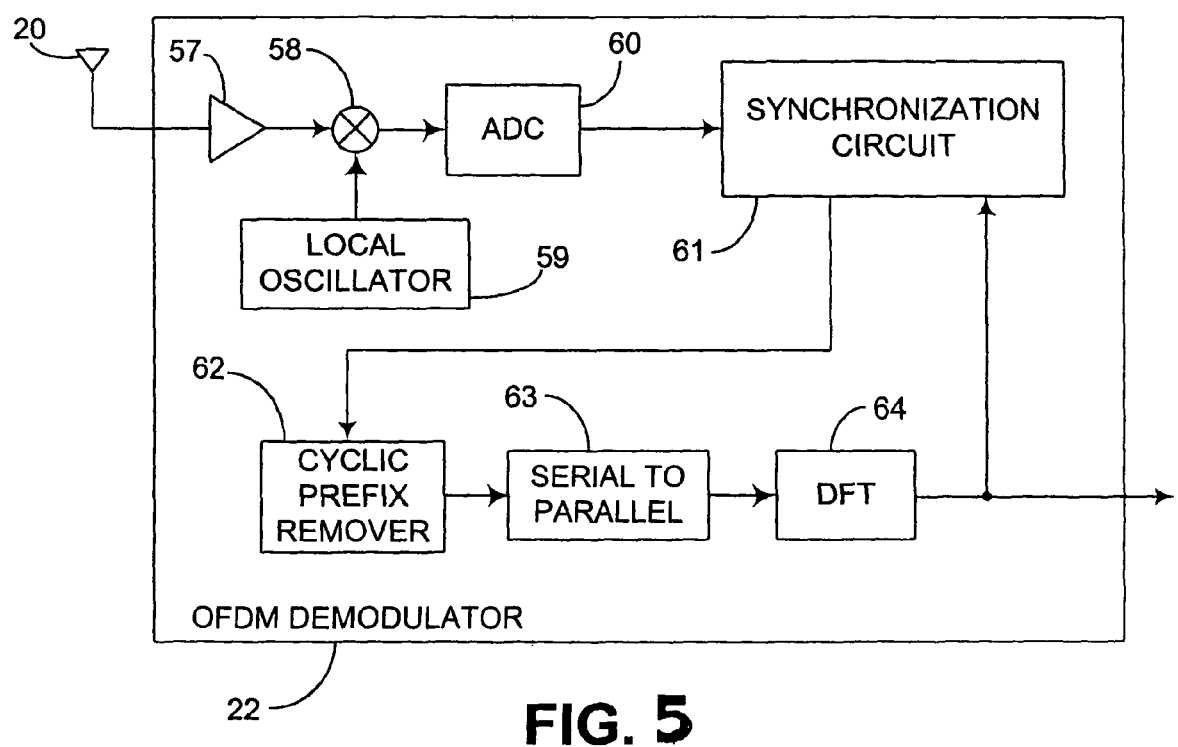
FIG. 5 is a block diagram illustrating an exemplary embodiment of one of the OFDM demodulators shown in FIG. 1.

FIG. 5 illustrates an exemplary embodiment of one of the OFDM demodulators 22 of the receiver 10 of the MIMO OFDM system 6. Received signals from the receiving antenna 20 are input into a preamplifier 57, which amplifies the received signals to a level at which further processing may be performed. The output of the preamplifier 57 is connected to a mixer 58. A local oscillator 59 provides a signal to the mixer 58 where the signal has a frequency designed to demodulate the received amplified signal. The demodulated signal is then output to an analog-to-digital converter (ADC) 60, which converts the analog signals into discrete time samples. The sampling frequency of the ADC may be doubled to acquire synchronization to an accuracy of ½ the sampling time T. The discrete time samples are applied to a synchronization circuit 61, which is discussed below with reference to FIG. 6. The output of the synchronization circuit 61 is provided to the cyclic prefix remover 62, which removes the cyclic prefixes inserted between each block of N samples. If the sampling frequency of the ADC is doubled, then every other sample is chosen to form a block of N samples. The blocks of N samples are then serial-to-parallel converted using serial-to-parallel converter 63. The parallel signals are input to a Discrete Fourier Transform (DFT) stage 64, which converts the time domain samples back to the frequency domain. Thus, the conversation completes the synchronization and demodulation by the OFDM demodulators 22.

Figure 6:
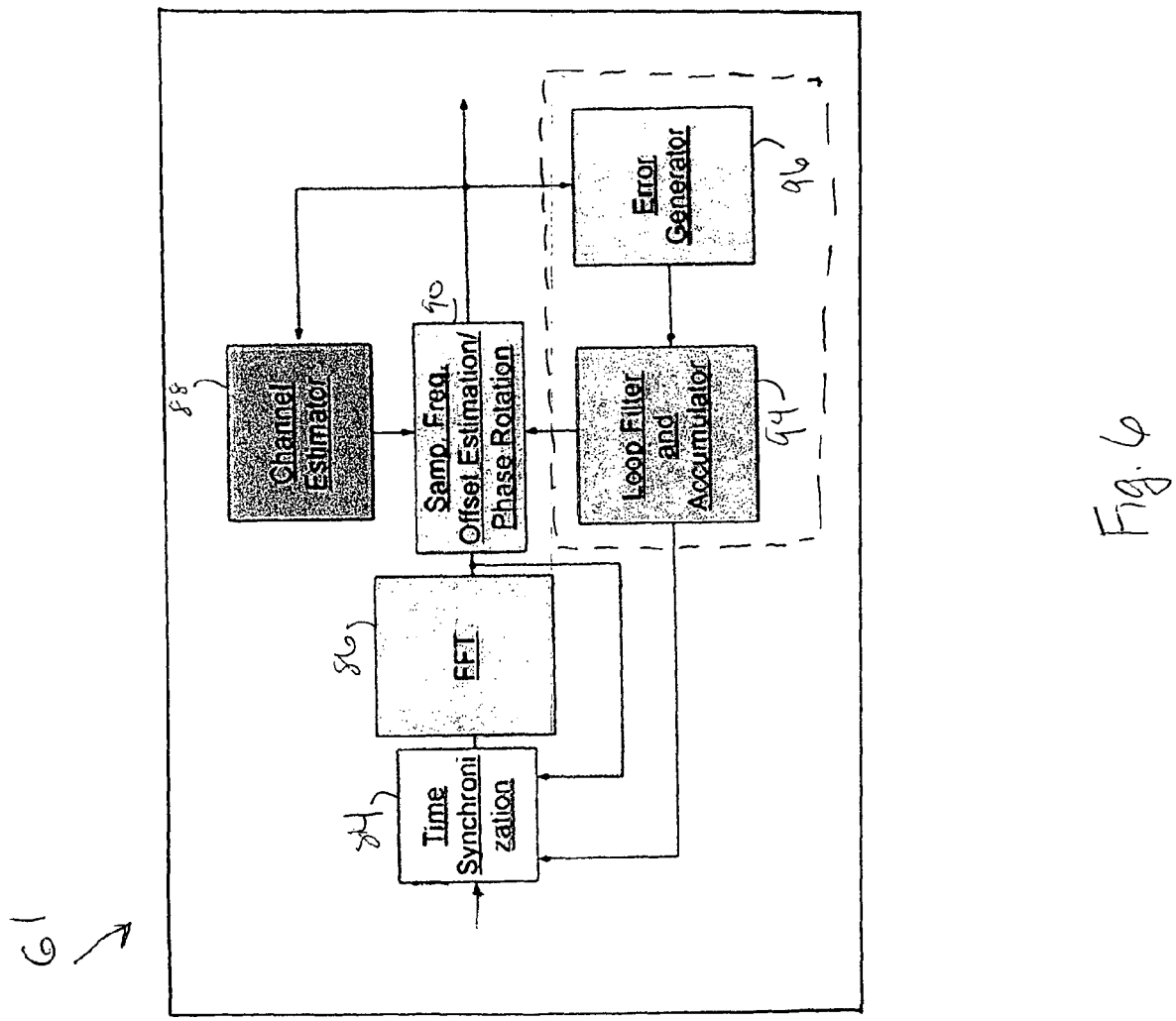
FIG. 6 is a block diagram illustrating an exemplary embodiment of the synchronization circuit shown in FIG. 5.

FIG. 6 is a block diagram illustrating synchronization processes that may be conducted by the synchronization circuit 61. At least two synchronization processes are provided: an open loop process; and a closed loop process. The open loop process may be used in situations where the sampling frequency offset does not change too much with time, or the variations are slow as compared to the frame rate. The closed loop process may be used whenever the sampling frequency variations are fast as compared to the frame rate and it is possible that the optimal timing instant may drift by an amount greater than a sample within a frame.

With respect to either the open loop or the closed loop process, the synchronization circuit 61 receives the signals that had been converted into discrete time samples by the ADC of the OFDM demodulator 22 illustrated in FIG. 5. In the synchronization circuit 61, the signals enter a time synchronization process 84. An exemplary time synchronization process has been described in the commonly owned, patent application entitled: Time and Frequency Synchronization in Multi-Input, Multi-Output (MIMO) Systems, which was filed in the United States Patent and Trademark Office on Apr. 24, 2002 and assigned Ser. No. 10/128,821, now U.S. Pat. No. 7,088,782, and which is incorporated herein by reference.

After the time synchronization process 84, the discrete time samples enter a Fast Fourier Transform (FFT) 86, which acts as a demodulator. After demodulation, the signal continues through the open loop process or the closed loop process.

In the open loop process, the signal is subjected to sampling frequency offset estimation/phase rotation 90 and channel estimation 88, and the results are sent from the synchronization circuit 61 to the cyclic prefix remover 62 in the OFDM demodulator (as illustrated in FIG. 5). Further details regarding the channel estimation 88 (also referred to as channel estimator) may be obtained from the commonly owned, copending patent application entitled: Estimating Channel Parameters in Multi-Input, Multi-Output (MIMO) Systems filed in the United States Patent and Trademark Office on Apr. 24, 2002 and assigned Ser. No. 10/128,756, and which is incorporated herein by reference.

Exemplary equations relating to the actions of the open loop process are set forth below:

$$R_{k,Q\times L} = \Lambda_{k,Q\times Q} \cdot S_{k,Q\times Q} \cdot \eta_{k,Q\times L} + W_{k,Q\times L} \qquad \text{System Equation}$$

$R_{k,Q\times L}$=Received demodulated sample matrix for the k'th subcarrier, $S_{k,Q\times Q}$=Transmit symbol matrix, $\eta_{k,Q\times L}$=Channel coefficient matrix in the frequency domain, $\Lambda_{k,Q\times Q}$=Diagonal matrix, $(\Lambda_k)_{qq}$=exp$\{j2\pi\beta(dQ+q)k(N+G)/N\}$, where $\beta=(T'-T)/T$ (where T is the sampling time at the transmitter and T' is the sampling time at the receiver), is the sampling frequency offset and d is the running index of the number of Q blocks of OFDM symbols transmitted in the frame.

$W_{k,Q\times L}$=Matrix of AWGN samples with variance No/2 per dim.

The system equation relates to the received demodulated pilot tone used to calibrate the system.

Open Loop Sampling Frequency Offset Estimation/Phase Rotation

OLI A. Sampling Frequency Offset Estimation $$\hat{\beta}_{k,initial} = \frac{\angle \text{ trace}\left[R_k^{H \ previous} R_k^{p,current}\right] + f_k(\text{pilot}(d-1), \text{pilot}(d))}{2\pi Qk(N+G)/N}$$

$$= \frac{\angle \sum_{l=1}^{L} |R_{l,l}|^2 \exp(j2\pi\beta Qk(N+G)/N) + f_k(\text{pilot}(d-1), \text{pilot}(d))}{2\pi Qk(N+G)/N}$$

$$\hat{\beta} = \sum_{k \in pilots} w_k \hat{\beta}_{k,initial}$$

$H$ is the Hermitian operator equivalent to conjugate-transpose of a matrix. $R_k^{H,previous}$ is the received demodulated sample matrix at the k'th pilot tone for a block of Q OFDM symbols at the running index (d−1). $R_k^{H,current}$ is the received demodulated sample matrix at the k'th pilot tone for a block of Q OFDM symbols at the running index d. The estimate $\hat{\beta}_d$ may then be passed through a low pass filter or a moving average filter to remove sudden changes caused due to extraneous impediments such as noise. A moving average filter may be represented by the following equation $$\hat{\beta}_d = \frac{1}{M} \sum_{n=d-M+1}^{d} \hat{\beta}_n$$

where M is the length of the window. Larger the M more stable is the estimate of β however slower is its response to any variations in β. The typical value of M may be chosen as QP/2 where P is the number of blocks of Q OFDM symbols in the frame however it may be greater than of less than that value.

OLI B. Phase Rotation

Once the estimate of the sampling frequency offset β is found, it is used to construct the sampling offset correction matrix $\Lambda_k$ which is then inverted and applied to the received sample matrix $R_k$ to obtain the new estimate of the received sample matrix $R_k^{new}$.

$$\hat{R}_k^{new} = \left(\hat{\Lambda}_k^{new}\right)^{-1} R_k$$

$$\hat{\Lambda}_k^{new} = \begin{bmatrix} \exp\left(j2\pi k \hat{\beta}(dQ+1)\left(\frac{N+G}{N}\right)\right) & & & \\ & \exp\left(j2\pi k \hat{\beta}(dQ+2)\left(\frac{N+G}{N}\right)\right) & & \\ & & \ddots & \\ & & & \exp\left(j2\pi k \hat{\beta}(dQ+Q)\left(\frac{N+G}{N}\right)\right) \end{bmatrix}$$

OLII. Open Loop Channel Estimation

Since sampling frequency was not accounted for at the time of channel estimation, improved channel estimates may be obtained as follows $$\hat{\eta}_k = B_k^H (B_k B_k^H)^{-1} R_k \text{ where } B_k = \Lambda_k S_k$$

OLIII. Open Loop Tracking

Once the initial sampling frequency offset is done (Step OLI.) and channel estimates have been improved (Step OLII.), sampling frequency offset may be tracked using $$\hat{\Lambda}_k = R_k C_k^{pH} (C_k^p C_k^{pH} + \delta I)^{-1}, \delta \to 0 \text{ where } C_k^p = S_k^p \eta_k^p$$

$$\hat{\beta}_{k,new} = \frac{L \sum_{q=1}^{Q-1} \left[\hat{\Lambda}_{q,q,k}^{Hp} \hat{\Lambda}_{q+1,q+1k}^{p}\right]}{2\pi k(N+G)/N}, \quad \hat{R}_k^{new} = (\hat{\Lambda}_k^{new})^{-1} R_k$$

In the equations above, I can refer to an integer (such as 1, 2, . . . ). The tracking of the sampling frequency offset may be either carried out using either Step OL I. or OLIII. or a combination of both OLI and OL3.

Closed Loop Sampling Frequency Offset Estimation/Phase Rotation.

Advantageously, the closed loop process continually estimates, corrects and/or tracks the sampling frequency offset. The closed loop process includes actions undertaken by the sampling frequency offset estimator/phase rotator 90, an error generator 96, and a loop filter and accumulator 94. Exemplary equations relating to the actions are provided below:

CLI. Phase Rotation $$\hat{R}_k^{new} = \left(\hat{\Lambda}_k^{new}\right)^{-1} R_k$$

$$\hat{\Lambda}_k^{new} = \begin{bmatrix} \exp(j2\pi k/N \cdot \text{fraction}(err_1(d))) & & & \\ & \exp(j2\pi k/N \cdot \text{fraction}(err_2(d))) & & \\ & & \ddots & \\ & & & \exp(j2\pi k/N \cdot \text{fraction}(err_3(d))) \end{bmatrix}$$

CLII. Error Generation

Let $$\Omega_k^{early} = \Lambda_k^{-\zeta} S_k^p \eta_k^p$$

$$\Omega_k^{late} = \Lambda_k^{+\zeta} S_k^p \eta_k^p$$

$$\Omega_k^{early} = \begin{bmatrix} \exp(-j2\pi k\zeta/N) & & & \\ & \exp(-j2\pi k\zeta/N) & & \\ & & \ddots & \\ & & & \exp(-j2\pi k\zeta/N) \end{bmatrix}$$

$$\Omega_k^{early} = \begin{bmatrix} \exp(j2\pi k\zeta/N) & & & \\ & \exp(j2\pi k\zeta/N) & & \\ & & \ddots & \\ & & & \exp(j2\pi k\zeta/N) \end{bmatrix}$$

Let $$C_k^{early} = \hat{R}_k^{new} \Omega_k^{early\,H} (\Omega_k^{early} \Omega_k^{early\,H})^{-1}$$

$$C_k^{early} = \hat{R}_k^{new} \Omega_k^{late\,H} (\Omega_k^{late} \Omega_k^{late\,H})^{-1}$$

Let $$\Xi_q^{early} = \sum_{k \in pilots} C_{q,q,k}^{early} \quad q = 1, \ldots Q$$

$$\Xi_q^{late} = \sum_{k \in pilots} C_{q,q,k}^{late} \quad q = 1, \ldots Q$$

The instantaneous error signal is generated from the early and late outputs as $$a_q(d,\epsilon) = |\Xi_q^{early}|^2 - |\Xi_q^{late}|^2$$

CLIII. Low Pass Filtering and Error Accumulation

The instantaneous error is passed through a low pass filter. Low pass filter may be a simple first order low pass filter of the type $$b(d,\epsilon) = \alpha \cdot a(d,\epsilon) + (1-\alpha)a(d-1,\epsilon)$$

where $\alpha$ is the forgetting factor or it can be a more complex filter based on any of the filter design techniques. The low pass filter may also be a moving average filter as discussed or any filter designed using certain specific design criteria.

The output of the low pass filter is then accumulated as $$err(n) = \sum_{d=1}^{n} b(d, \varepsilon)$$

Finally, the error is separated into its integer (integer(err)) and fractional (fractional(err)) components and sent to the timing synchronization and phase rotation circuits, respectively.

In one possible embodiment, a non-coherent early-late Phase Locked Loop (PLL) is used for error generation. The PLL in the closed loop mode requires that the initial time synchronization be accurate to one-half of the sampling time T. This is already achieved since the sampling frequency is doubled at the front end of the receiver.

Also, it is found that doubling the sampling frequency for the open loop estimation improves the system performance tremendously and the system is able to provide a similar performance for a frame size larger by a factor ten times or more.

The Loop Filter and Accumulator 94 incorporates a low pass filter and the output of the filter is used to obtain the filtered estimate of the Sampling Frequency Offset, which is used to calculate a correction signal to be added to the system at the Time Synchronization stage 84. In other words, the output of the low-pass filter is accumulated over the time period of the frame. It is then broken into integer and fractional components to be sent back to the phase rotation block and to the time synchronization circuit for synchronization instant adjustment.

The sampling frequency offset detection, estimation and control system may be used in either open loop or a closed loop mode as the system design sees fit.

It should be emphasized that the above-described embodiments of the present invention are merely possible examples of implementations, merely set forth for a clear understanding of the principles of the inventions. Many variations and modifications may be made to the above-described embodiments of the inventions without departing substantially from the principles of the inventions. All such modifications and variations are intended to be included herein within the scope of this disclosure and protected by the following claims.

We claim:

1. A method comprising:
   receiving, at a receiver, a signal from a transmitter, wherein the received signal includes data and a matrix of pilot tones inserted into the data by the transmitter;
   determining an estimated sampling frequency offset of the received signal based at least in part on the matrix of pilot tones;
   generating a sampling offset correction matrix based at least in part on the estimated sampling frequency offset; and
   determining a corrected sampling frequency offset of the received signal based at least in part on the estimated sampling frequency offset and the sampling offset correction matrix.

2. The method of claim 1, further comprising:
   amplifying the received signal to generate an amplified signal; and
   demodulating the amplified signal using a local signal generated by a local oscillator of the receiver, wherein the demodulated signal is used in determining the estimated sampling frequency offset of the received signal and determining the corrected sampling frequency offset of the received signal.

3. The method of claim 1, wherein the corrected sampling frequency offset is determined using a synchronization circuit.

4. The method of claim 1, further comprising converting the received signal into discrete time samples using an analog-to-digital converter of the receiver, wherein the converted received signal is used in determining the estimated sampling frequency offset of the received signal and determining the corrected sampling frequency offset of the received signal.

5. The method of claim 4, further comprising using a fast Fourier transform process to demodulate the discrete time samples.

6. The method of claim 1, further comprising recovering the data from the received signal based at least in part on the corrected sampling frequency offset.

* * * * *

UNITED STATES PATENT AND TRADEMARK OFFICE
CERTIFICATE OF CORRECTION

| | | |
|---|---|---|
| PATENT NO. | : 7,889,819 B2 | Page 1 of 1 |
| APPLICATION NO. | : 10/680629 | |
| DATED | : February 15, 2011 | |
| INVENTOR(S) | : Mody et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this
Fifth Day of July, 2011

David J. Kappos
*Director of the United States Patent and Trademark Office*